(12) United States Patent
Andreoli et al.

(10) Patent No.: US 10,933,398 B2
(45) Date of Patent: Mar. 2, 2021

(54) DEVICE FOR CARRYING OUT A CHEMICAL REACTION BY A CONTINUOUS METHOD

(71) Applicants: Fluitec Invest AG, Hettlingen (CH); Rudolf GmbH, Geretsried (DE)

(72) Inventors: Silvano Andreoli, Neftenbach (CH); Tobias Vögeli, Winterthur (CH); Daniel Altenburger, Oerlingen (CH); Alain Georg, Hettlingen (CH); Michael Schacht, Eurasburg (DE); Gunther Duschek, Benediktbeuern (DE)

(73) Assignees: Fluitec Invest AG, Hettlingen (CH); Rudolf GmbH, Geretsried (DE)

( * ) Notice: Subject to any disclaimer, the term of this patent is extended or adjusted under 35 U.S.C. 154(b) by 188 days.

(21) Appl. No.: 15/775,521

(22) PCT Filed: Nov. 3, 2016

(86) PCT No.: PCT/EP2016/076570
§ 371 (c)(1),
(2) Date: May 11, 2018

(87) PCT Pub. No.: WO2017/080909
PCT Pub. Date: May 18, 2017

(65) Prior Publication Data
US 2018/0326393 A1    Nov. 15, 2018

(30) Foreign Application Priority Data

Nov. 11, 2015    (EP) .................................... 15194070

(51) Int. Cl.
*B01J 19/24* (2006.01)
*B01J 19/00* (2006.01)
*C08F 2/01* (2006.01)

(52) U.S. Cl.
CPC ......... *B01J 19/2465* (2013.01); *B01J 19/002* (2013.01); *B01J 19/0013* (2013.01);
(Continued)

(58) Field of Classification Search
USPC ............................. 526/68; 422/622; 585/504
See application file for complete search history.

(56) References Cited

U.S. PATENT DOCUMENTS

| | | |
|---|---|---|
| 3,035,040 A | 5/1962 | Findlay |
| 4,742,131 A | 5/1988 | Asanuma et al. |

(Continued)

FOREIGN PATENT DOCUMENTS

| | | |
|---|---|---|
| DE | 10110847 A1 | 9/2002 |
| EP | 0307238 A2 | 3/1989 |

(Continued)

OTHER PUBLICATIONS

Machine translation of Written Description of DE 10110847 A1; publication date: Sep. 2002. (Year: 2002).*

(Continued)

*Primary Examiner* — Fred M Teskin
(74) *Attorney, Agent, or Firm* — The Webb Law Firm (57) ABSTRACT

A device for carrying out a chemical reaction by a continuous method has a reactor with at least two reactor sections which define a direction of flow. The reactor has plug flow properties along the direction of flow. A recirculation line is present to withdraw a partial flow from the reactor at a first point and return it to the reactor at a second point located above the first point in the direction of flow. Means are provided which prevent a temperature increase in the reactor over a predetermined temperature range, for example change of more than approximately 50 K.

21 Claims, 4 Drawing Sheets

(52) U.S. Cl.
CPC ......... *B01J 19/242* (2013.01); *B01J 19/2415* (2013.01); *B01J 2219/002* (2013.01); *B01J 2219/0024* (2013.01); *B01J 2219/00033* (2013.01); *B01J 2219/00063* (2013.01); *B01J 2219/00074* (2013.01); *B01J 2219/0077* (2013.01); *B01J 2219/00081* (2013.01); *B01J 2219/00083* (2013.01); *B01J 2219/00211* (2013.01); *B01J 2219/00213* (2013.01); *B01J 2219/00231* (2013.01); *B01J 2219/00263* (2013.01)

(56) References Cited

U.S. PATENT DOCUMENTS

| | | | |
|---|---|---|---|
| 4,918,168 | A | 4/1990 | Stepaniuk et al. |
| 4,948,847 | A | 8/1990 | Morita et al. |
| 5,484,882 | A | 1/1996 | Takada et al. |
| 7,829,640 | B2 * | 11/2010 | Barbieri ............... B01J 19/0053 422/132 |
| 2004/0249112 | A1 | 12/2004 | DeBruin et al. |

FOREIGN PATENT DOCUMENTS

| | | | | |
|---|---|---|---|---|
| EP | | 1067352 | A1 | 1/2001 |
| EP | | 2286904 | A1 | 2/2011 |
| EP | | 2596860 | A1 | 5/2013 |
| EP | | 2796195 | A1 | 10/2014 |
| GB | | 2184736 | A | 7/1987 |
| JP | | 2006517965 | A | 8/2006 |
| WO | | 8904822 | A1 | 6/1989 |
| WO | | 2004074227 | A1 | 9/2004 |
| WO | | 2008141472 | A1 | 11/2008 |
| WO | WO 2010/149632 | A1 * | 12/2010 | ............... B01J 19/24 |
| WO | | 2013132042 | A1 | 9/2013 |

OTHER PUBLICATIONS

Hugo et al., "Umwandlung diskontinuierlicher chemischer Prozesse in eine kontinuierliche Prozessfuhrung unter Verwendung mikrostrukturierter Reaktoren—Reaktionstechnik und Sicherheit", Chemie Ingenieur Technik, 2009, pp. 145-152, vol. 81.

Gierke, "Bundesministerium fur Umwelt, Naturschutz und Reaktorsicherheit", TRAS 410, 2012, 26 pp.

Chen, "Chemical reaction engineering and reactor", National defense industry press, Jul. 31, 1988, p. 1-3, English-language abstract attached.

Zhang et al., "Bioreactor engineering", East China University of Science and Technology Press, Oct. 21, 2001, p. 1-5, English-language abstract attached.

* cited by examiner

DEVICE FOR CARRYING OUT A CHEMICAL REACTION BY A CONTINUOUS METHOD

CROSS-REFERENCE TO RELATED APPLICATIONS

This application is the United States national phase of International Application No. PCT/EP2016/076570 filed Nov. 3, 2016, and claims priority to European Patent Application No. 15194070.7 filed Nov. 11, 2015, the disclosures of which are hereby incorporated in their entirety by reference.

BACKGROUND OF THE INVENTION

Technical Field

The present invention relates to a device for carrying out a chemical reaction by a continuous method, a reactor and a control unit of such a device, and a corresponding method.

Description of Related Act

A chemical reactor is the part of a plant in which chemical processes take place and chemical reactions are carried out. Such reactors are ordinarily operated in batch processes or continuously. Semi-batch processes are also known.

In the batch process, a quantity of material is fed into the reactor as a whole, and after completion of the production process, removed as a whole. The product thus remains in the reactor until the reaction has run its course and the next production step can be completed.

One speaks of semi-continuous operation or a semi-batch process when a reactant is first charged into the reactor, and further components are then added or removed during the course of the reaction. In semi-continuous operation, the reactor is operated in continuous mode with respect to some of the components and in discontinuous mode with respect to other components.

Compared to the batch process, continuous operation offers various decisive advantages, such as improved safety and more uniform product quality. Continuous operation is economically advantageous, as the need for the reactor downtimes required in batch and semi-batch methods for charging and discharging processes is obviated. Long reaction times resulting from technical safety requirements or additional reactor-specific heat transfer performance requirements such as constant heating and cooling processes can also be avoided.

The publication "Conversion of discontinuous chemical processes to continuous process control using microstructured reactors—Reaction technology and safety", Chem. Ing. Tech. 2009, 81, No. 1-2, by Peter Hugo and Fernando Lopez, presents methods for converting batch processes to continuous operation.

In reaction engineering, an analogy comparing the discontinuous batch reactor (BR) and the continuous plug flow tube reactor (PFTR) can be used for conversion of a discontinuous batch process. In an isothermal reaction, the two reactors show the same turnover and the same selectivity if the Damköhler numbers of the two reactors are the same. In this case, with identical initial concentration values, the reaction time must be the same for both processes.

On the one hand, continuous tubular reactors with plug flow properties are empty tubes with flows having a Reynolds number of at least 2,400 to at least 20,000, depending on nominal diameter and viscosity. On the other hand, static mixers or mixer-heat exchangers such as those described in EP 1067352, WO 2008/141472, EP 2796195, and EP 2286904 possess plug flow properties in all flow ranges.

One can picture plug flow as the migration of an extremely long series of infinitesimally thin slices of the reaction mass through the reactor. These slices do not show any material or heat exchange among one another. As all concentrations and the temperature inside a slice are identical, favourable and rapid intermixing is of vital importance. One can speak of plug flow properties if intermixing occurs that is preferably essentially homogeneous, and particularly preferably homogeneous, or sufficiently radial intermixing occurs and a Bodenstein number of >100 is reached in the reactor. Specifically, radial intermixing is understood to refer to the radial intermixing of chemical components within the reaction mass.

The Bodenstein number is usually described using the one-dimensional dispersion model. This model conception takes the one-dimensional process in a flow tube (plug flow) as a starting point. In the main flow direction z, there is a flow rate $u_z$ at which the respective mixer cross section A is virtually constant. Deviations from the ideal tubular flow occur due to molecular diffusion, turbulent convection, and the parabolic rate profile (e.g. laminar tubular flow) resulting from boundary friction (roughness). As a value for characterizing these effects, the axial dispersion coefficient $D_{ax}$ is used, which is thus a measure for back mixing. The initial equation for the one-dimensional dispersion model is as follows:

$$\frac{\partial c}{\partial t} = -u_z \cdot \frac{\partial c}{\partial z} + D_{ax} \cdot \frac{\partial^2 c}{\partial z^2} \tag{1}$$

and is indicated in dimensionless form in order to make it easier to solve. The following applies in the stationary case:

$$\frac{\partial \left(\frac{c}{c_0}\right)}{\partial \left(\frac{t}{\tau}\right)} = -\frac{\partial \left(\frac{c}{c_0}\right)}{\partial \left(\frac{z}{L}\right)} + \left(\frac{D_{ax}}{u_z \cdot L}\right) \cdot \frac{\partial^2 \left(\frac{c}{c_0}\right)}{\partial \left(\frac{z}{L}\right)^2} = 0 \tag{2}$$

A dimensionless characteristic value is obtained therein, i.e. the so-called Bodenstein number, $$Bo = \frac{u_z \cdot L}{D_{ax}} \tag{3}$$

which is defined by a "characteristic length" L of the mixer-heat exchanger housing. The exact solution of the stationary and dimensionless equation is as follows (according to Levenspiel and Smith):

$$c_i\{\theta, Bo\} = h(\theta) = \sqrt{\frac{Bo}{4 \cdot \pi \cdot \theta}} \cdot e^{\left[-\frac{(1-\theta)^2 \cdot Bo}{4 \cdot \theta}\right]} \tag{4}$$

The displacement model without axial dispersion for Bo=∞ (ideal tubular flow, plug flow properties) and the back mixing model with axial dispersion for Bo=0 (ideal stirred tank, loop reactor with high recirculation ratio) are boundary cases of the dispersion model.

In most cases, semi-batch methods are used for rapid exothermic reactions. In this case, operation of the ignited semi-batch reactor is ordinarily carried out with controlled feeding, with the material fed in being rapidly converted. Because of the low temporary residual concentrations in the reactor, such reactors are highly safe even in strongly exothermic reactions, provided that the official "Technical Rules for Plant Safety", TRAS 410, are complied with.

In addition to the thermal stability of the educts, thermal process safety is also of vital importance in this case. A simple preliminary decision for assessing the safety of normal operation can be derived from a known reaction heat $\Delta H_R$. The adiabatic temperature increase $\Delta T_{adiab}$ can be determined therefrom according to equation (5). The reaction temperature T increases in linear fashion with turnover $U_A$, assuming a constant reaction enthalpy $\Delta H_R$ and a specific heat capacity $c_p$:

$$|T = T_0 + \frac{-\Delta H_{m,r} \cdot C_{A,0}}{\rho \cdot c_p} \cdot \left(\frac{n_{i,0} - n_i}{n_{i,0}}\right) = \quad (5)$$

$$T_0 + \frac{\Delta H_R}{m \cdot c_p} \cdot U_A = T_0 + \Delta T_{adiab} \cdot U_A$$

If the adiabatic temperature increase is known, the following assessment applies to the proposed reaction in accordance with TRAS 410:

When the reaction takes place in normal operation, if the adiabatic temperature increase of the reaction is less than 50 K, and if no thermal instabilities are observed in the starting materials, the reaction mixture, or the products within a temperature range of $(T_0+\Delta T_{adiab})$, normal operation can be deemed to be safe. The same applies if the heat tone of any decomposition reactions or side reactions is so low that, even together with the reaction heat of the desired reaction, it does not cause an adiabatic temperature increase of over 50 K. Here, the technical plant must be configured to withstand possible pressure increases (due to vapour pressure or gas release) resulting from this limited temperature increase, which as a rule is the case for the pressure vessels and connected system components usually used for reactions. The result of this simple approach is that the temperature increase in the event of a cooling malfunction is moderate, and the process is therefore safe.

The continuous counterpart to a semi-batch reactor is a tubular reactor or mixer-heat exchanger reactor connected in series having plug flow properties and a plurality of axially arranged lateral dosing points. The mixture first placed in the semi-batch reactor is supplied as a main flow, and the other partially dosed portions are continuously supplied via the lateral dosing points. This continuous arrangement makes it possible to carry out favourable exothermic reactions while retaining product quality. However, the expense required for the numerous dosing points with the numerous dosing pumps is considerable. In addition, the use of a large number of dosing pumps increases the risk of breakdowns, which can adversely affect the safety of the process.

The "Technical Rules for Plant Safety", TRAS 410, which are extremely easy to apply, also apply for semi-batch processes. There are no applicable official rules for continuous processes, which deters many operators from conversion to a continuous process. The above-mentioned report, "Conversion of discontinuous chemical processes to continuous process control using microstructured reactors—Reaction technology and safety", does recommend a possible procedure. Unfortunately, this procedure is only suitable for microreactors. For large-scale facilities, this recommendation is not applicable, or is applicable only with difficulty.

SUMMARY OF THE INVENTION

The object of the invention is therefore to provide a continuous process for exothermic reactions that is as flexible and safe as possible.

The device according to the invention for carrying out a chemical reaction by a continuous method has a reactor with at least two reactor sections that define a direction of flow. The reactor has plug flow properties along the direction of flow. According to the invention, a recirculation line is provided in order to withdraw a partial flow from the reactor at a first point and return it to the reactor at a second point located above the first point in the direction of flow. Moreover, at least one means is provided that prevents a temperature increase in the reactor over a predetermined temperature range, specifically a temperature change of more than approximately 50 K.

This at least one means can be provided by the configuration and dimensioning of the reactor. However, the at least one means preferably comprises at least one temperature sensor that measures the temperature or temperature changes in the reactor. A plurality of temperature sensors are preferably provided that are arranged successively in the direction of flow. In preferred embodiments, at least part, and preferably all of these temperature sensors are arranged together in a protective tube.

An evaluation unit, which may be part of a control unit, is preferably present in order to evaluate the signals from the plurality of temperature sensors. This makes it possible to determine the local position along the direction of flow at which a reaction was ignited in the reactor. This information can be used to control the reactor. In other words, by means of a control unit, measures are taken depending on where the reaction was ignited. Such measures include changing the recirculation rate and/or shutting down the educt supply and/or varying the additive supply.

A control unit is preferably provided that controls a recirculation rate of the recirculation line according to the value measured by the temperature sensor. This is facilitated if the recirculation line is connected to the reactor via a controllable valve. This control unit is preferably the control unit mentioned in the above paragraph.

The solution according to the invention is preferably based on technical safety rules, and even more preferably on the Technical Rules according to TRAS 410.

The device according to the invention constitutes a continuous circuit. It has at least two reactor sections with plug flow properties and partial material recirculation. By selecting the proper feed rate, residence time in the reactor section, and recirculation rate, and/or by corresponding temperature monitoring in the reactor, a continuous process can be carried out instead of a semi-batch process, or the semi-batch process can be converted to a continuous process. In this way, the advantages of a continuous process can be utilized while nevertheless taking into consideration the necessary safety aspects.

Such recirculation into the reactor could be carried at the expense of selectivity and thus product quality, particularly in the case of extremely high recirculation rates. In the case of high recirculation rates, the reactor performance could also be significantly reduced, with the result that complete turnover can no longer be achieved. Therefore, the reactor according to the invention should have at least some, and preferably all of the following features:

the reactor is suitable for continuous operation;
the selectivity and product quality of the reactor are high;
the reactor can be safely operated;
safety evaluation can be carried out simply;
maximum turnover can be achieved with minimal reactor volume, and
the site at which the reaction is ignited can be monitored.

Surprisingly, it was found that in reactors with plug flow properties and partial recirculation at low recirculation rates, high selectivity and product quality are ensured. It was also found that an ignited reactor that behaves polytropically can be quite favourably monitored with temperature sensors.

One speaks of a polytropic reaction when a reaction is carried out neither adiabatically nor isothermally, i.e. when the temperature along the reactor sections changes or is measurably different. Based on this change, the site of ignition can be monitored, which allows the reaction to be carried out more safely. However, the prerequisite for this is reliable and precise temperature measurement along the reactor sections with plug flow properties.

It is known that in all cases, the temperature measured by a temperature sensor is simply its own temperature. This means that a temperature sensor must be sufficiently immersed in the product to be measured so that it can measure the temperature thereof. A thermometer is immersed to a sufficient degree when no further change in the indicated temperature occurs on further immersion into the constant-temperature reaction volume. The resulting measurement errors depend largely on
  immersion depth,
  the design of the sensor, such as its insulation, diameter, and length,
  the properties of the product, and
  the flow rate of the product.

It was found that for example, when the sensor is immersed in the flowing product in the centre of the longitudinal axis of the reactor sections, it is possible to measure the temperature with a high degree of precision even at flow rates of 1 mm s$^{-1}$. The sensor should preferably extend into the static mixer(s) so that the flow against the sensor tip increases markedly. It is this very flow against the tip that can be of decisive importance for the temperature measurement. CFD calculations and measurements have shown that in the case of very small flows, the immersion depth for laboratory applications should be at least ten times the sensor diameter. For industrial applications with less stringent accuracy requirements, an immersion depth corresponding to five times the sensor diameter is ordinarily sufficient.

A preferred embodiment for temperature measurement is a protective tube with a plurality of internal temperature sensors. Ideally, the maximum number of sensors should be installed in a protective tube that is as thin and long as possible.

In configuring the reactor according to the invention, reduced selectivity and poor product quality can be caused on the one hand by great temperature differences and on the other by an excessively high recirculation rate. Both of these parameters, specifically the course of temperature and the recirculation rate, i.e. the dilution factor, must be adjusted to conform to the reaction. It was also recognized that in the event of a cooling malfunction (for example, if the cooling system fails), the temperature increase over the entire reactor must be <50 K in order to easily allow compliance with TRAS 410. This adiabatic temperature increase is exceeded if the recirculation rate or the dilution factor y according to equation (6) is too low. The product of the inflow stream (total of the additive flows) and the dilution factor y thus indicates the recirculation flow between the reactor inlet P1 and the recirculation outlet P2 with which the reactor can be safely operated.

$$y = \frac{\Delta T_{adiab} \cdot U_A}{50 \text{ K}} - 1 \tag{6}$$

This attractively simple method according to the invention allows highly reliable control of the ignited reactor. Finally, it should be noted that in the reactor sections with plug flow properties between the recirculation outlet and the reactor outlet, the adiabatic temperature increase should be less than a predetermined temperature, particularly less than 50 K.

The entire reactor can therefore be safely operated even in the event of a cooling malfunction. It is even possible to set the adiabatic temperature increase at slightly more than 50 K. However, the prerequisite is to have sufficient data available from the reaction system as to how much heat flows into the temperature-control fluid in the event of a cooling malfunction. Nevertheless, it turns out that these transient calculations are difficult. However, it is possible to determine these values by means of experiments. This is again contingent on precise temperature measurement over the entire reactor.

At least one reactor section is preferably a mixer-heat exchanger. Almost all or all of the reactor sections are preferably static mixers or mixer heat exchangers. Depending on the embodiment, some of the mixer heat exchangers or mixers, or all of them, may be cooled and/or heated.

The recirculation line preferably leads back from a first or second reactor section in the direction of the flow. It preferably leads back to the reactor inlet.

The recirculation line preferably leads away at a point of the reactor at which a reaction fluid, in particular a reaction liquid, has a turnover of at least 30%, preferably at least 60%, and even more preferably at least 80%, and wherein the reaction fluid at one reactor outlet has a turnover of greater than 80%, preferably greater than 95%, and even more preferably greater than 99%. In this text, the reaction fluid is also referred to as the material flow.

The reactor inlet, the reactor outlet, and the recirculation line preferably have a Bodenstein number of greater than 20 per meter.

The recirculation line also preferably has plug flow properties. The plug flow properties of the reactor and optionally the recirculation line should preferably be provided over the entire length respectively.

The recirculation line is preferably configured as a conveying unit or preferably has corresponding conveying elements.

The recirculation rate or the dilution factor can be controlled by means of the pump curve of the pump, particularly the pump of the recirculation line, or by means of a flowmeter.

In the method according to the invention for carrying out a chemical reaction in a continuous process, a material flow in a temperature-controlled reactor with a plug flow is continuously supplied in a direction of flow, wherein a part of the material flow is at least temporarily withdrawn from the reactor at a distance from a reactor outlet of the reactor and returned in a flow direction above the reactor, wherein a recirculation rate is selected that prevents a temperature increase in the reactor above a predetermined temperature change, preferably of approximately 50 K.

According to the invention, because of this recirculation, in particular the controlled recirculation, high temperature peaks in the reactor are prevented. If a plurality of temperature sensors are used, and if they are preferably arranged so that they are distributed in the direction of flow, the local positions of any reaction ignitions in the reactor can be identified, and the control unit of the reactor can make the corresponding adjustments. The reactor is monitored, and because of the control unit, timely measures can be taken, up to and including shutting down the educt supply.

In an alternative variant of the method, the reactor is operated in normal mode as a pure plug flow reactor. Recirculation is activated only in an emergency as a safety measure. For this purpose, recirculation can be completely shut down during operation. Recirculation is only activated in the event of a cooling malfunction or improper ignition of the reaction. Both cases can be detected by temperature measurement in the reactor. If one of the above emergencies occurs or an elevated temperature increase is detected, recirculation is activated by the control unit. In such cases, activation is preferably initiated by switching valves. The valves preferably have no dead space. In this case, the educt supply is preferably interrupted. In an emergency of this type, the heat can therefore be sufficiently and safely discharged, and flowing of non-depleted educt into the sump is prevented.

Examples of reactions for which the reactor according to the invention can be used include hydrosilylation, esterification, nitration, diazotization, rearrangement, alkylation, halogenation, hydration, oxidation, or polymerization reactions such as radical, ionic, anionic, or living polyaddition, polycondensation, or neutralization. It can also be used for gas-liquid reactions. For example, the gas phase can be separated for this purpose before recirculation and then returned to the reactor at the inlet.

Further embodiments are specified in the dependent claims.

BRIEF DESCRIPTION OF THE DRAWINGS

Further advantages, characteristics, and details of the invention are presented in the following description of preferred illustrative embodiments, and with reference to the drawings, which are intended to be solely explanatory and are not to be interpreted as limiting the scope of the invention. The drawings show the following.

DESCRIPTION OF THE PREFERRED EMBODIMENTS

Figure 1:
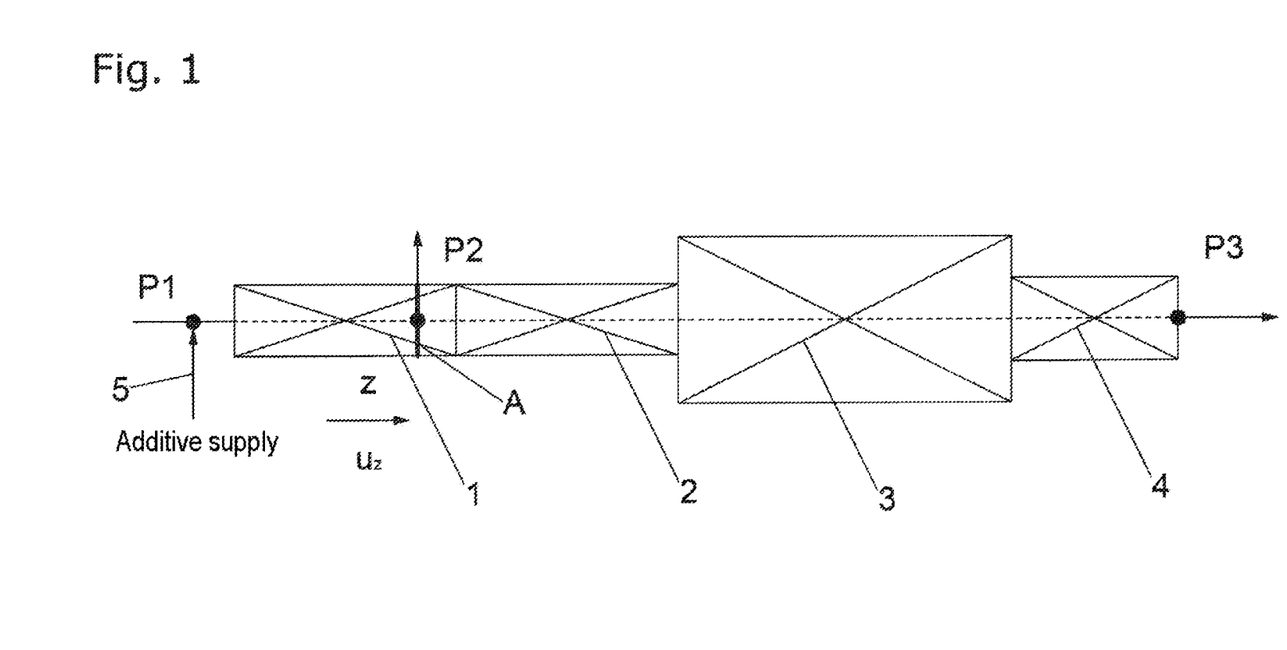
FIG. 1 is a schematic representation of a plug flow reactor according to the invention with different reactor sections according to a first embodiment.

FIG. 1 shows a first embodiment of a reactor according to the invention. It is composed of at least two, and preferably a plurality of reactor sections 1, 2, 3, 4, wherein at least some of the reactor sections can be mixer-heat exchangers. In this example, at least the second reactor section 2 is a mixer-heat exchanger. It shows the mixer cross section A. The reactor sections can be characterized because on the one hand, the prevailing process conditions therein differ from those in the directly adjacent sections, and on the other, because the reactor sections show different geometries and cross sections. For example, the first reactor section is an inlet with plug flow properties, the second reactor section 2 is a mixer-heat exchanger with a large heat exchange surface that can show plug flow properties, the third reactor section 3 is a static mixer with plug flow properties and a longer residence time, and the fourth reactor section 4 is an outlet with plug flow streaming and/or plug flow properties.

The reactor inlet is denoted by P1 in FIG. 1 and the reactor outlet by P3. The main flow direction is indicated by an arrow and denoted by the reference symbol z. "$u_z$" denotes the flow rate.

In the area of the reactor inlet P1, at least one additive supply 5 is preferably provided in order to supply additives to the material flow, in particular liquids and/or gases, before or on entering the reactor.

In at least one reactor section, preferably the first or an anterior reactor section in the direction of flow, the reactor according to the invention has a partial recirculation line to the reactor inlet P1. The corresponding recirculation outlet is denoted by P2 in FIG. 1. The recirculation can take place directly to P1 or via intermediate sections not shown here. The recirculated material flow forms a dilution flow. The dilution factor is denoted by y and is determined based on the material flows withdrawn from and returned to the reactor.

The reactor sections 1, 2, 3, 4 show plug flow properties. The reactor inlet P1, the reactor sections 1, 2, 3, 4 forming a transfer line, and the reactor outlet P3 have high Bodenstein numbers per metre of >80. The connections of the individual reactor sections are preferably configured according to EP 2796195 A1. Because of these properties, the reactor possesses the desired plug flow properties over its entire length.

The functioning of the reactor can therefore be explained by means of simple, virtually ideal model concept. This model is based on the following five properties:
 plug flow in the direction of flow z in the reactor over the entire flow and viscosity ranges of the reactor, i.e. over all of the reactor sections,
 immediate axial mixing of the feed flow with the dilution flow and/or the additive flows,
 setting of extremely short mixing times,
 controlled recirculation factor or dilution factor y due to compact and precise flow measurement,
 no reaction-induced volume contraction.

Example

The adiabatic temperature increase of the rapid exothermic reaction is 250 K with a turnover $U_A$ of 100%. A first-order reaction is assumed, as in this case the turnover can be numerically calculated.

Figure 2:
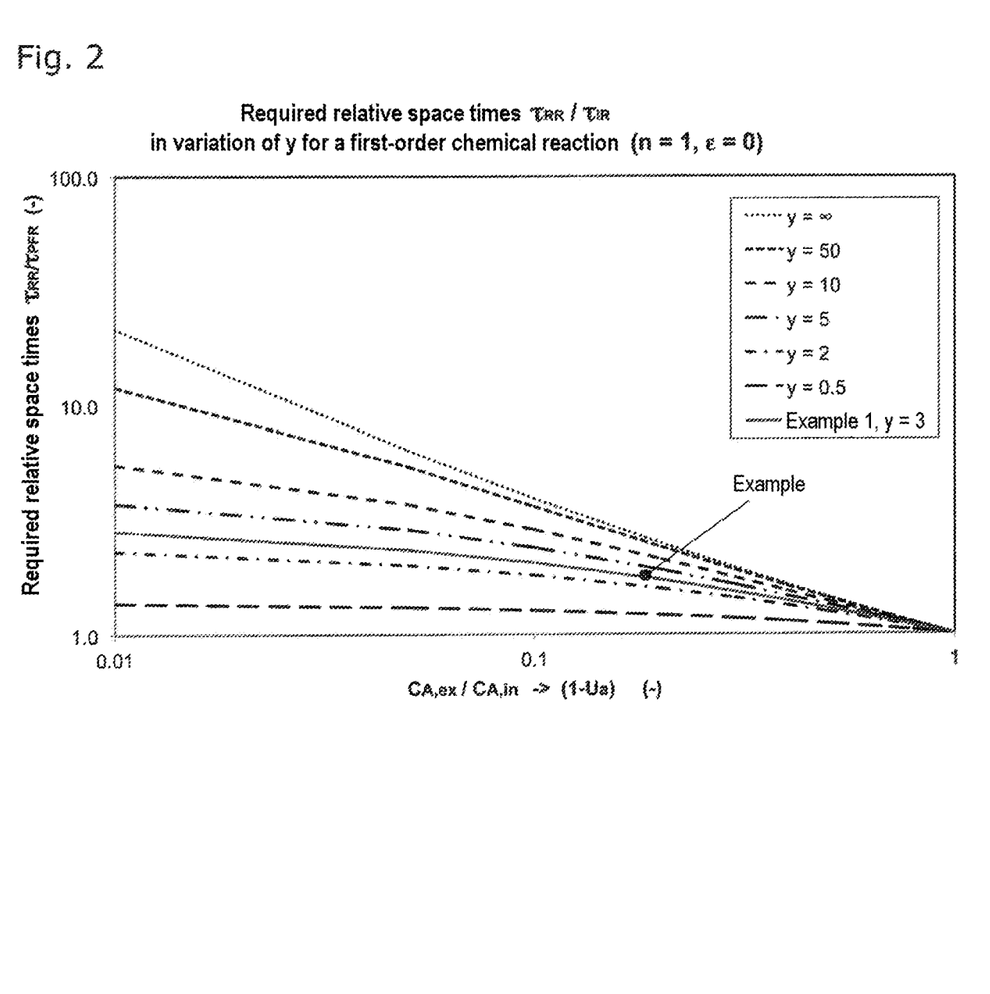
FIG. 2 is a graphical representation of the required relative space times $\tau_{RR}/\tau_{IR}$ for a calculated first-order chemical reaction (n=1, e=0) with variation of the dilution factor y ($\tau_{RR}$ denotes the mean residence time in the reactor of P1 after and P2 in the case of recirculation; $\tau_{IR}$ denotes the mean residence time in the reactor with plug flow properties of P1 after and P3 without recirculation.

The data according to FIG. 2 are based on these assumptions and calculations. Based on FIG. 2, the advantages of the reactor according to the invention can be clearly seen.

According to the invention, the reactor shown in FIG. 1 is configured for semi-batch processes in accordance with TRAS410. The reactor operates in an ignited state. According to TRAS410, a maximum adiabatic temperature increase of 50 K over the entire reactor must not be exceeded. Instead of a semi-batch process, however, a continuous process is used, or the semi-batch process is converted into a continuous process.

The reactor is subdivided into reactor sections with recirculation from P1 to P2 and reactor sections with recirculation from P2 to P3.

80% of the educt is preferably converted in the area between reactor inlet P1 and recirculation outlet P2, which causes an adiabatic temperature increase of 200 K. The required dilution factor can also be calculated using equation (7). Here, the dilution factor y is 3.0, as the following calculation shows:

$$y = \frac{\Delta T_{adiab} \cdot U_A}{50 \text{ K}} - 1 = \frac{250 \text{ K} \cdot 0.8}{50 \text{ K}} - 1 = 3.0 \qquad (7)$$

If the reactor is operated with a dilution factor of y=3, despite the ignited state, a temperature increase of 50° C. cannot be exceeded. The remaining residual 20% of the educt is reacted between the recirculation outlet P2 and the reactor outlet P3. This corresponds to a maximum adiabatic temperature increase of 50 K in these sections.

In the case of an adiabatic temperature increase of 300° C., the dilution factor would have to be adapted accordingly. In such a case, the reactor sections from P1 to P2 could be operated with 83.33% turnover and a recirculation rate of y=4, and the reactor sections from P2 to P3 could be operated with 16.67% turnover.

This highly simple safety monitoring according to TRAS 410 thus allows safe operation even in a continuous process. Reactor performance also remains extremely high. Taking the example of a dilution factor of y=3 and a turnover of 80%, only 1.5 times the reactor volume of a conventional plug flow reactor without recirculation is required according to FIG. 2. If one were to operate with higher turnovers in the reactor area from the reactor inlet P1 to the recirculation outlet P2, considerably larger reactor volumes would be required. The reduction in reactor performance is therefore moderate in our example.

Finally, the plug flow properties between the reactor inlet P1 and the reactor outlet P3 provide a high degree of selectivity and a high-quality product. If the recirculation line from the recirculation outlet P2 to the reactor inlet P1 is also provided with plug flow properties, the product quality, depending on the reaction, will be further improved.

By correspondingly designing the feed rate, the residence time between the reactor inlet and the recirculation outlet, and the recirculation rate, the reactor can be configured so that the specified maximum temperature increase of 50° C. is not exceeded.

However, at least one first temperature sensor is preferably provided that measures the temperature T in the reactor in the area between the reactor inlet P1 and the recirculation outlet P2 and reports this temperature to a control unit. This at least one first temperature sensor 7 is not shown in FIG. 1. However, it can be seen in FIG. 3. It is preferably immersed approximately in the centre of the cross section of the corresponding reactor section, here the first reactor section 1. It is preferably immersed over a length of at least five times its sensor diameter.

A temperature sensor 7, 7' is inserted into the product space to a sufficient degree when additional immersion in the product volume no longer causes any change in the temperature displayed. In all cases where immersion errors are suspected, one should change the immersion depth by one or two sensor diameters and observe whether the temperature displayed remains constant. The required immersion depth increases at temperatures above room temperature up to a maximum, which is reached at approximately 400° C.

Based on the temperature measurement, the control unit monitors with at least one temperature sensor whether, and in the case of a plurality of sensors, where the reaction has been ignited. The control unit can also monitor and adjust the recirculation rate of the dilution factor y. In this case, determination of the dilution factor y can take place based on flow measurement or the characteristics of the pump, here the recirculation pump. Moreover, the control unit can also e.g. monitor the temperature-control device, and in the case of a malfunction, the control unit can control the educt supply or shut it off completely. Control of the educt supply should preferably be carried out by controlling a preferably provided feed pump, which feeds the educts into the reactor. The control unit completely assumes the task of safely controlling the reaction. If necessary, the control unit can process additional data from ATR or NIR infrared sensors, which in an embodiment are arranged in or on the reactor.

The flow is preferably recirculated to reactor inlet P1. However, it can also be recirculated to a preceding reactor section, particularly in cases where the recirculation outlet is arranged not in the first, but in a subsequent reactor section. In this case, the recirculation inlet is therefore not the reactor inlet, but a separate inlet. A plurality of successive recirculation outlets and/or recirculation inlets can also be provided in the direction of flow.

Figure 3:
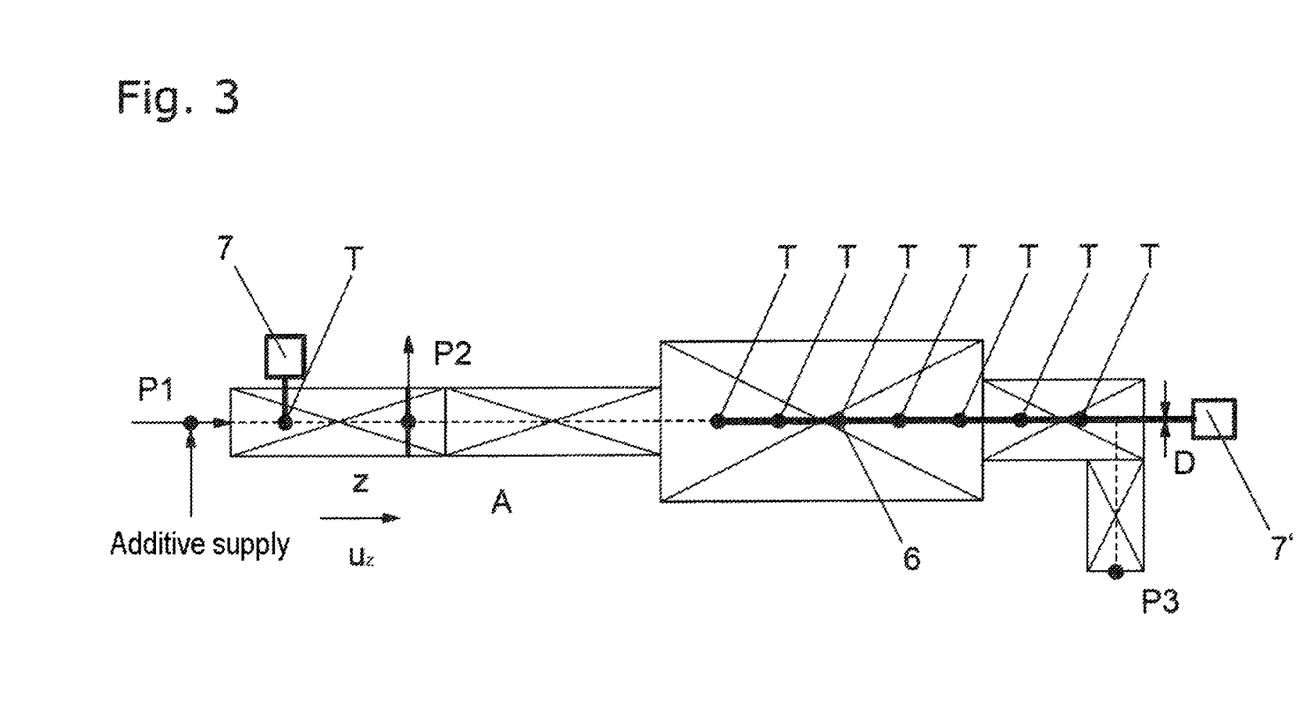
FIG. 3 is a schematic representation of a plug flow reactor according to the invention in a second embodiment with differing reactor sections and temperature sensors distributed on the axis.

FIG. 3 shows a second embodiment of the reactor according to the invention. Here, a protective tube 6 with at least one second temperature sensor 7' runs upstream to the recirculation outlet P2. The protective tube 6 has an outer diameter D that is many times smaller than the inner diameter of the corresponding reactor section. A plurality of second temperature sensors 7' are preferably arranged successively in the direction of flow. These second temperature sensors can be arranged together in a protective tube 6 or in a plurality of successive protective tubes. In this example, the second temperature sensors are arranged in a third and a fourth reactor section. However, they can also be arranged in other sections, e.g. particularly preferably in the first section.

These second temperature sensors 7' are also used to monitor the temperature T in the respective reactor sections. If a predetermined maximum temperature, such as the above-mentioned 50° C., is exceeded, a corresponding signal is sent to the control unit, and the recirculation rate of the dilution factor y is correspondingly increased. Feeding of the educts can also be interrupted if necessary. If the temperature drops below a minimum level measured by at least one first and/or at least one second temperature sensor 7, 7', the dilution factor y can also be reduced by the control unit. The temperature sensors should preferably be arranged so that the location at which ignition of the reaction takes place can be identified and monitored.

Figure 4:
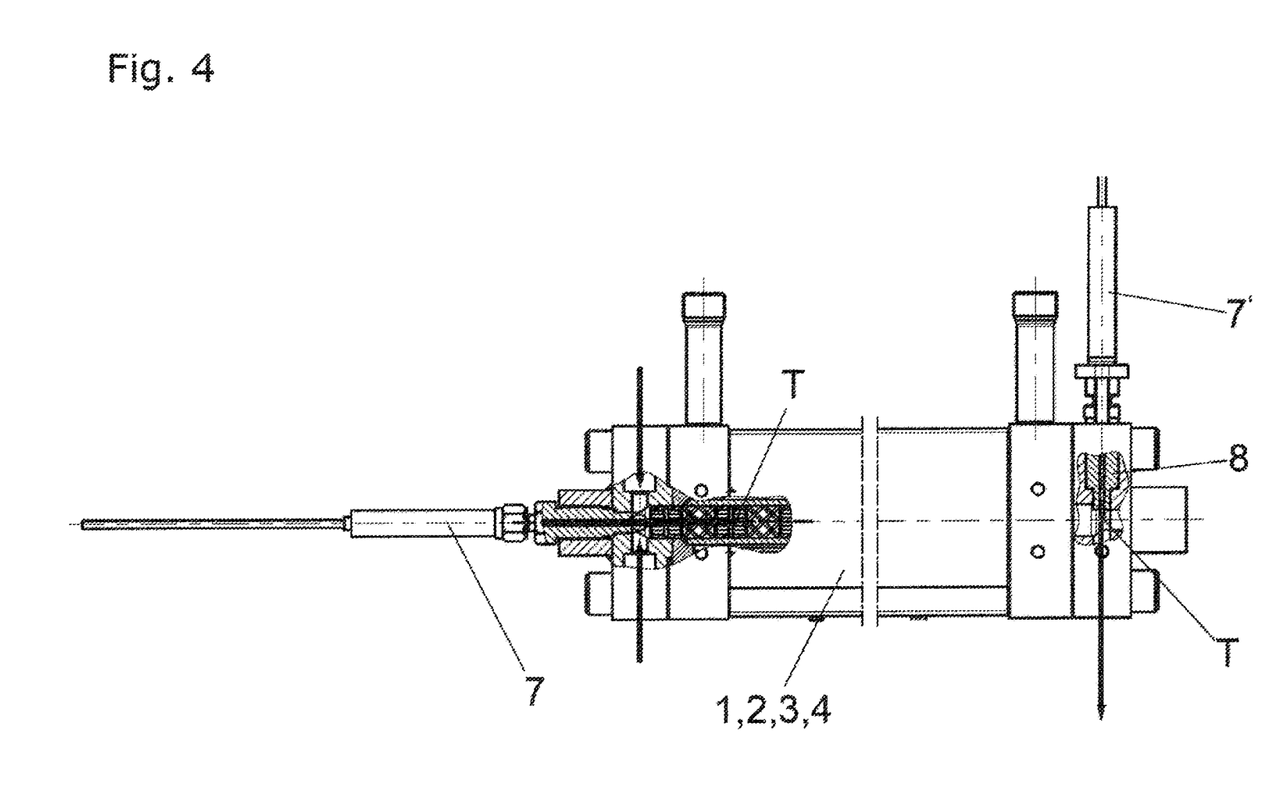
FIG. 4 is a schematic representation of a reactor section of a reactor according to FIG. 3.

Sensors of a known type can be used as the first and second temperature sensors 7, 7'. FIG. 4 shows two possible embodiments of temperature sensors 7, 7' that could be used in the two illustrative embodiments described above according to FIGS. 1 and 3.

FIG. 4 shows a sensor 7, 7' configured axially and a sensor 7, 7' configured radially. In the axially configured sensor 7, 7', the immersion depth can be adjusted to a sufficient degree. In the use of static mixers or mixer-heat exchangers as reactor sections, for example, the mixing element can be precisely drilled out in order to allow sufficient immersion in the reactor section. Here, the protective tube 6 can have a plurality of temperature sensors. Examples include classical PT100 sensors, thermoelements, or fibre-optic sensors. The sensor 7, 7' with the protective tube 6 can be immersed further into the reactor section. If the sensor 7, 7' is configured radially, the required immersion depth may not be sufficient, particularly in the case of small reactor sections. In this case, the sensor 7, 7' must be provided with additional insulation 8 in order to ensure sufficient measurement of the product. For example, PTFE, PP, PET, POM, of PEEK plastics may be used as insulation. Insulation 8 can be implemented using any desired insulator.

The invention claimed is:

1. A device for carrying out a chemical reaction by a continuous method, said device comprising:
   a reactor with at least two reactor sections which define a direction of flow,
   wherein the reactor has plug flow properties along the direction of flow,
   wherein a recirculation line is provided in order to withdraw a partial flow from the reactor at a first point and return it to the reactor at a second point located above the first point in the direction of flow,
   wherein at least one means is provided that prevents a temperature increase in the reactor over a predetermined temperature range,
   wherein the means comprises at least one temperature sensor that measures the temperature or temperature changes in the reactor, and
   wherein a control unit is provided that controls a recirculation rate of the recirculation line according to the value measured by the temperature sensor.

2. The device according to claim 1, wherein a plurality of temperature sensors are provided that are arranged successively in the direction of flow.

3. The device according to claim 2, wherein at least part of the plurality of temperature sensors are arranged together in a protective tube.

4. The device according to claim 2, wherein an evaluation unit is provided in order to determine a local position along the direction of flow at which a reaction has been ignited inside the reactor based on signals from the plurality of temperature sensors.

5. The device according to claim 1, wherein the recirculation line is connected to the reactor via a controllable pump.

6. The device according to claim 1, wherein at least one reactor section is a mixer-heat exchanger.

7. The device according to claim 1, wherein the recirculation line leads back from a first or second reactor section in the direction of the flow.

8. The device according to claim 1, wherein the recirculation line leads back to a reactor inlet of the reactor of the device.

9. The device according to claim 1, wherein the recirculation line is located at a point of the reactor at which the reaction fluid has a turnover of at least 30%, and wherein the reaction fluid at an outlet of the reactor of the device has a turnover of greater than 99%.

10. The device according to claim 1, wherein the recirculation line has plug flow properties.

11. The device according to claim 1, wherein the at least one means prevents a temperature change of more than approximately 50 K.

12. The device according to claim 1, wherein the recirculation line is located at a point of the reactor at which the reaction fluid has a turnover selected from the group of a turnover of at least 30%, a turnover of at least 60%, a turnover of at least 80%, and wherein the reaction fluid at an outlet of the reactor of the device has a turnover selected from the group of a turnover greater than 80%, a turnover greater than 95%, and a turnover of greater than 99%.

13. A method for carrying out a chemical reaction in a continuous process, in a device for carrying out a chemical reaction by a continuous method, wherein said device has a reactor with at least two reactor sections which define a direction of flow, and wherein the reactor has plug flow properties along the direction of flow, wherein a recirculation line is provided in order to withdraw a partial flow from the reactor at a first point and return it to the reactor at a second point located above the first point in the direction of flow, and wherein at least one means is provided that prevents a temperature increase in the reactor over a predetermined temperature range, wherein the means comprises at least one temperature sensor that measures the temperature or temperature changes in the reactor and wherein a control unit is provided that controls a recirculation rate of the recirculation line according to the value measured by the temperature sensor, wherein a material flow in the reactor in the plug flow is continuously fed in the direction of flow, wherein the part of the material flow is at least temporarily withdrawn from the reactor at a distance from a reactor outlet of the reactor and returned in the flow direction above the reactor, and wherein the recirculation rate is selected that prevents a temperature increase in the reactor above a predetermined temperature change.

14. The method according to claim 13, wherein the reactor further comprises a recirculation line for recirculating the part of the material flow temporarily withdrawn from the reactor and a reactor inlet, wherein the reactor inlet, the reactor outlet, and the recirculation line have a Bodenstein number of greater than 20 per metre.

15. The method according to claim 13 for carrying out hydrosilylation, esterification, nitration, diazotization, neutralization, rearrangement, alkylation, halogenation, hydration, oxidation, or polymerization.

16. Use of a device for carrying out a chemical reaction by a continuous method, wherein said device has a reactor with at least two reactor sections which define a direction of flow, and wherein the reactor has plug flow properties along the direction of flow, wherein a recirculation line is provided in order to withdraw a partial flow from the reactor at a first point and return it to the reactor at a second point located above the first point in the direction of flow, and wherein at least one means is provided that prevents a temperature increase in the reactor over a predetermined temperature range, wherein the means comprises at least one temperature sensor that measures the temperature or temperature changes in the reactor and wherein a control unit is provided that controls a recirculation rate of the recirculation line according to the value measured by the temperature sensor for carrying out a chemical reaction.

17. A control unit of a device for carrying out a chemical reaction by a continuous method, wherein said device has a reactor with at least two reactor sections which define a direction of flow, and wherein the reactor has plug flow properties along the direction of flow, wherein a recirculation line is provided in order to withdraw a partial flow from the reactor at a first point and return it to the reactor at a second point located above the first point in the direction of flow, and wherein at least one means is provided that prevents a temperature increase in the reactor over a predetermined temperature range, wherein the means comprises at least one temperature sensor that measures the temperature or temperature changes in the reactor and wherein a control unit is provided that controls a recirculation rate of the recirculation line according to the value measured by the temperature sensor, wherein said control unit controls a recirculation rate in a recirculation line according to a signal of at least one temperature sensor.

18. The control unit according to claim 17, wherein the control unit controls the recirculation rate in the recirculation line according to a signal of a measured temperature sensor value.

19. The method according to claim 13, wherein the recirculation rate prevents a temperature increase of approximately 50 K.

20. A device for carrying out a chemical reaction by a continuous method, wherein said device has a reactor with at least two reactor sections which define a direction of flow, and wherein the reactor has plug flow properties along the direction of flow, wherein a recirculation line is provided in order to withdraw a partial flow from the reactor at a first point and return it to the reactor at a second point located above the first point in the direction of flow, and wherein at least one means is provided that prevents a temperature increase in the reactor over a predetermined temperature range, wherein the recirculation line has plug flow properties.

21. A device for carrying out a chemical reaction by a continuous method, wherein said device has a reactor with at least two reactor sections which define a direction of flow, wherein the reactor defines an entire length, and wherein the reactor has plug flow properties along the direction of flow along the entire length, wherein a recirculation line is provided in order to withdraw a partial flow from the reactor at a first point and return it to the reactor at a second point located above the first point in the direction of flow, and wherein at least one means is provided that prevents a temperature increase in the reactor over a predetermined temperature range, wherein the means comprises a plurality of temperature sensors that measure the temperature or temperature changes in the reactor and wherein the plurality of temperature sensors are arranged successively in the direction of flow.

* * * * *